United States Patent [19]

Hari

[11] Patent Number: 4,737,581
[45] Date of Patent: Apr. 12, 1988

[54] PHENYL-AZO-HYDROXYNAPHTHOIC ACID AMIDE PIGMENTS CONTAINING AT LEAST ONE CARBONAMIDE GROUP

[75] Inventor: Stefan Hari, Villars-sur-Glâne, Switzerland

[73] Assignee: Ciba-Geigy Corporation, Ardsley, N.Y.

[21] Appl. No.: 724,424

[22] Filed: Apr. 18, 1985

[30] Foreign Application Priority Data

Apr. 25, 1984 [CH] Switzerland ............ 2042/84

[51] Int. Cl.$^4$ .......... C09B 29/20; C09B 67/48; D06P 1/04; D06P 1/44
[52] U.S. Cl. .......................... 534/867; 8/508; 8/509; 8/510; 8/512; 8/513; 8/514; 8/515; 8/518; 8/519; 8/520; 534/581; 534/575; 534/863; 534/866; 534/887; 106/288 Q; 106/308 Q; 106/309; 106/23; 106/22
[58] Field of Search .......... 534/867; 8/508–510, 8/512–515, 518–520; 106/288 Q, 308 Q, 309, 23, 22

[56] References Cited

U.S. PATENT DOCUMENTS

| | | | |
|---|---|---|---|
| 3,086,006 | 4/1963 | Löhe et al. | 534/867 |
| 3,113,938 | 12/1963 | Nakaten et al. | 534/867 |
| 3,509,125 | 4/1970 | Konco et al. | 534/867 |
| 3,660,373 | 5/1972 | Roueche | 534/867 |

FOREIGN PATENT DOCUMENTS

| | | | |
|---|---|---|---|
| 034179 | 2/1970 | Canada | 534/867 |
| 1153841 | 9/1963 | Fed. Rep. of Germany | 534/867 |
| 1225321 | 9/1966 | Fed. Rep. of Germany | 534/867 |
| 1544708 | 7/1969 | Fed. Rep. of Germany . | |
| 1011971 | 12/1965 | United Kingdom | 534/867 |
| 1028564 | 5/1966 | United Kingdom | 534/867 |
| 1077077 | 7/1967 | United Kingdom | 534/867 |
| 1180498 | 2/1970 | United Kingdom . | |

OTHER PUBLICATIONS

Chem. Abst. 95, 134377y (1981).

Primary Examiner—Floyd D. Higel
Assistant Examiner—Carolyn S. Greason
Attorney, Agent, or Firm—Luther A. R. Hall

[57] ABSTRACT

Azo compounds of the formula I

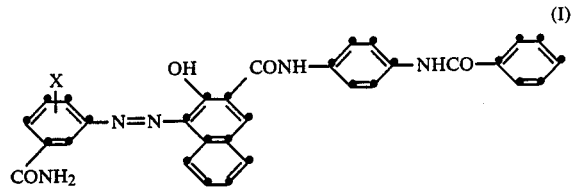

wherein X is —H, —CH$_3$, —CF$_3$, —NO$_2$, —COOR$_1$, —NHCOR$_2$ or —COHN$_2$, and R$_1$ and R$_2$ are as defined in claim 1, are suitable for pigmenting high-molecular organic material.

4 Claims, No Drawings

PHENYL-AZO-HYDROXYNAPHTHOIC ACID AMIDE PIGMENTS CONTAINING AT LEAST ONE CARBONAMIDE GROUP

The invention relates to novel monoazo compounds containing at least one carboxylic acid amide group, to —$CONH_2$, $R_1$ is alkyl and $R_2$ is alkyl, phenyl or substituted phenyl, are high-molecular organic material such as poly(vinyl chloride). The pigments have good color strength, luster and dispersibility coupled with good fastness to weathering, resistance to heat, light and migration in pigmented compositions.

Monoazo compounds containing in the diazo radical a carboxylic acid amide group are known. Examples thereof are the monoazo compounds formed from 2,3-hydroxynaphthoic acid arylides, as are described for example in the German Auslegeschrift No. 1,153,841 or in the G.B. Patent Specification No. 1,180,498.

The present invention relates to monoazo compounds of the formula I

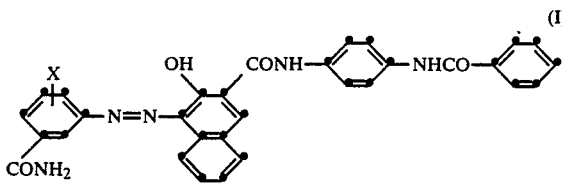

wherein

X is —H, —$CH_3$, —$CF_3$, —$NO_2$, —$COOR_1$, —NH-$COR_2$ or —$CONH_2$, $R_1$ is $C_1$–$C_4$-alkyl, and $R_2$ is $C_1$–$C_4$-alkyl, or phenyl which is unsubstituted or substituted by 1 to 3 halogen atoms and/or by one or two methyl or methoxy groups.

When $R_1$ and $R_2$ are $C_1$–$C_4$-alkyl, they are a methyl, ethyl, n-propyl, isopropyl, n-butyl, isobutyl or tert-butyl group. $R_1$ is preferably a methyl or ethyl group.

If phenyl denoted by $R_2$ is substituted by halogen atoms, these are fluorine, chlorine, bromine and iodine atoms, especially chlorine atoms.

Preferred compounds are those of the formula II

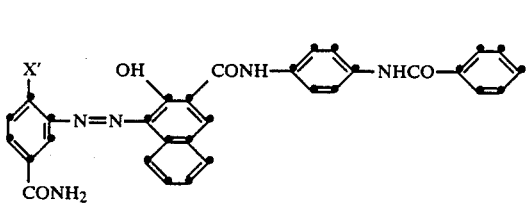

wherein X' is —H, —$CH_3$, —$CONH_2$, —$COOCH_3$ or —$COOC_2H_5$.

Particularly preferred are the azo compounds of the formula II in which X' is —H or, —$CH_3$.

The monoazo compounds of the formulae I and II are obtained by processes known per se, for example by diazotisation of an amine of the formula III

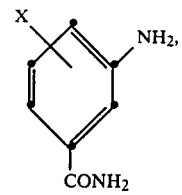

and coupling of the resulting diazo compound with 1-(2'-hydroxy-3'-naphthoylamino)-4-benzoylamino-benzene. As amines are preferably used aminobenzenes of the formula IV

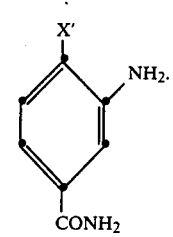

In the formulae III and IV, the symbols X and X' have the meanings defined in the foregoing.

The following may be mentioned as examples of amines of the formulae III and IV: 3-amino-benzamide, 3-amino-4-acetylamino-benzamide, 3-amino-4-carboethoxy-benzamide, 3-amino-4-carbomethoxy-benzamide, 3-amino-4-methyl-benzamide, 3-amino-5-acetylamino-benzamide, 3-amino-5-carbomethoxy-benzamide, 3-amino5-nitro-benzamide, 3-amino-5-trifluoromethyl-benzamide, 3-amino-6-benzoylamino-benzamide, 3-amino-6-carboethoxy-benzamide, 3-amino-6-carbomethoxy-benzamide, 3-amino-6-(2'-chlorobenzoylamino)-benzamide, 3-amino-6methyl-benzamide, 3-amino-6-nitro-benzamide, 3-aminophthalic acid diamide, 4-aminophthalic acid diamide, 5-aminoisophthalic acid diamide and 2-aminoterephthalic acid diamide.

The coupling of the diazo compound from the amine of the formulae III or IV with the 1-(2'-hydroxy-3'-naphthoylamino)-4-benzoylamino-benzene as coupling component is effected preferably in a slightly acid medium, advantageously in the presence of customary agents promoting coupling. There may be mentioned as such in particular dispersing agents, for example aralkylsulfonates, such as dodecylbenzenesulfonate, 1,1'-dinaphthylmethane-2,2'-disulfonic acid or polycondensation products of alkylene oxides. The dispersion of the coupling component can also advantageously contain protective colloids, for example methylcellulose, or smallish amounts of inert organic solvents difficultly soluble or insoluble in water, for example optionally halogenated or nitrated aromatic hydrocarbons, such as benzene, toluene, xylene, chlorobenzene, dichlorobenzene or nitrobenzene, as well as aliphatic halogenated hydrocarbons, for example carbon tetrachloride or trichloroethylene, also organic solvents miscible with water, such as acetone, methyl ethyl ketone, methanol, ethanol or isopropanol.

Furthermore, the coupling can be carried out also by suspending the amine of the formulae III or IV, which is to be diazotised, with the coupling component in an organic solvent, and treating it with a diazotising agent, especially with an ester of nitrous acid, such as methyl-, ethyl-, butyl-, amyl- or octyl-nitrite.

Finally, coupling can also be performed by diazotising the amine of the formulae III or IV, and firstly isolating it as a diazoamino derivative, and subsequently coupling this aryldiazoamino derivative with the aforementioned coupling component, in an inert solvent, in the presence of an acid, in the manner described for example in the G.B. Patent Specification No. 1,197,397. In the case of aminoterephthalic acid diamide derivatives, the benzotriazin-1,2,3-one-4 derivatives formed on diazotisation can be coupled with the coupling component, as described for example in the G.B. Patent Specification No. 1,256,260.

The resulting azo compounds precipitate generally at elevated temperature, and can be isolated in the pure form by filtration and optionally by washing with organic solvents.

The resulting azo compounds of the formulae I and II can be used as pigments for the dyeing of high-molecular organic material; they possess in general a good texture and can be employed for the most part as crude products. If necessary or desired, the crude products can be converted by grinding or kneading into a finely dispersed form. For this purpose, there are advantageously used grinding auxiliaries, such as inorganic and/or organic salts, in the presence or absence of organic solvents. After grinding, auxiliaries are removed in the customary manner: soluble inorganic salts for example with water and water-insoluble organic auxiliaries for example by steam distillation.

It is also possible to often obtain an improvement of the pigment properties by treatment of the crude azo compounds of the formulae I and II with organic solvents which boil above 100° C. Those which have proved to be particularly suitable are benzenes substituted by halogen atoms or by alkyl or nitro groups, such as xylenes, chlorobenzene, o-dichlorobenzene or nitrobenzene, as well as pyridine bases, such as pyridine, picoline or quinoline; also ketones, such as cyclohexanone, ethers, such as ethylene glycol monomethyl or monoethyl ether, amides, such as dimethylformamide or N-methyl-pyrrolidone, and also dimethylsulfoxide, sulfolane or water, optionally under pressure.

The subsequent treatment can also be performed in water in the presence of organic solvents and/or with the addition of surface-active substances or of aliphatic amines, or in liquid ammonia. The aftertreatment is carried out preferably by heating the azo compounds in the solvent to 100° to 150° C. By virtue of the abovementioned aftertreatments, the azo compounds according to the invention can, with regard to their particle size and their pigment properties, such as colouring strength and fastness to migration, light and weather, as well as transparency and covering power, be controlled and adjusted to have optimum values.

Depending on the purpose of application, it proves in some cases to be advantageous to use the azo compounds of the formulae I and II as toners or in the form of preparations.

The high-molecular organic materials to be dyed according to the invention can be of natural or synthetic origin. They can be for example: natural resins or drying oils, rubber or casein, or modified natural substances, such as chlorinated rubber, oil-modified alkyl resins and viscose, or cellulose ethers or esters, such as cellulose acetate, cellulose propionate, cellulose acetobutyrate or nitrocellulose, especially however fully-synthetic organic polymers (duroplasts and thermoplasts), such as are obtained by polymerisation, polycondensation or polyaddition. To be mentioned from the class of polymerisation resins are in particular: polyolefins, such as polyethylene, polypropylene or polyisobutylene; also substituted polyolefins, such as polymers formed from vinyl chloride, vinyl acetate, styrene, acrylonitrile, acrylic acid and/or methacrylic acid esters or butadiene, and also copolymers of the monomers mentioned, especially ABS or EVA.

From the series of polyaddition and polycondensation resins, there may be mentioned the condensation products of formaldehyde with phenols, the so-called phenoplasts; and the condensation products of formaldehyde with urea, thiourea and melamine, the so-called aminoplasts, the polyesters used as lacquer resins, both saturated, for example alkyde resins, and also unsaturated, such as maleic resins, also the linear polyesters and polyamides or silicones.

The high-molecular organic compounds mentioned can be in the form of individual compounds or as admixtures, or in the form of plastic compositions or melts, which can optionally be spun into fibres.

They can also be in the form of their monomers, or in the polymerised state in the dissolved form as film-forming agents or binders for lacquers or printing inks, for example linseed oil varnish, nitrocellulose, alkyl resins, melamine resins and urea-formaldehyde resins or acrylic resins.

The pigmentation of the high-molecular organic substances with the azo compounds of the formulae I and II is carried out for example by adding such an azo compound, optionally in the form of a masterbatch, to these substrates with the use of roll mills or mixing and grinding apparatus. The pigmented material is subsequently processed by processes known per se, such as calendering, pressing, extrusion, brushing (spreading) or casting, or by injection moulding, into the desired ultimate form. It is frequently desirable, for the production of non-rigid shaped articles, or for the reduction of their brittleness, to incorporate, before shaping, into the high-molecular compounds so-called plasticisers. It is possible to use as such for example esters of phosphoric acid, phthalic acid or sebacic acid. In the process according to the invention, the plasticisers can be introduced before or after the incorporation of the azo compound into the polymers. In order to obtain various shades of colour, it is also possible to add, in any desired amounts, to the high-molecular organic substances, in addition to the azo compounds of the formulae I and II, also fillers or other colour-imparting constituents, such as white, coloured or black pigments.

For the pigmenting of lacquers and printing inks, the high-molecular organic materials and the azo compounds of the formulae I and II, optionally together with additives such as fillers, other pigments, siccatives or plasticisers, are finely dispersed or dissolved in a common organic solvent or solvent mixture. The procedure can be such that the individual components are dispersed or dissolved, on their own or several jointly, and only then are all components brought together.

The dyeings obtained contain preferably 0.01–20 percent by weight of an azo compound of the formula I, for example in plastics, fibres, lacquers and printings, and are distinguished by good colouring strength, high saturation, good dispersibility and fastness to cross-lacquering, migration, heat, light and weather, and also by a good lustre.

Except where otherwise stated in the following Examples, the term 'parts' denotes parts by weight, and percentages are percent by weight.

EXAMPLE 1

Three parts of 3-amino-4-methyl-benzamide are dissolved in 60 parts by volume of glacial acetic acid at room temperature. The light-brown solution thus obtained is stirred up with 5.45 parts by volume of concentrated hydrochloric acid; the resulting suspension (hydrochloride) is then diluted with 10 parts of water and cooled to 5° C.; there are subsequently added dropwise at 5° C., in the course of 15 minutes, 5.4 parts by volume of 4N sodium nitrite solution, and the light-yellow diazo solution obtained is filtered until clear.

7.65 parts of 4-benzoylamino-1-(2'-hydroxy-3'-naphthoylamino)-benzene are dissolved in 70 parts of water, 60 parts by volume of ethyl alcohol and 4 parts by volume of 30% aqueous sodium hydroxide solution at 40° C. The solution obtained is filtered till clear and then cooled to 8° C.; there is subsequently added dropwise at this temperature, within 10 minutes, the above-prepared diazo solution, the pH-value of the resulting suspension being adjusted to 5 with 27 parts by volume of a 30% aqueous sodium hydroxide solution. The suspension thus obtained is firstly stirred for 4 hours until the temperature has risen to 20° C.; it is then heated within 1 hour to 75° C., and filtered at this temperature. The residue is washed with warm water until free from salt, and subsequently dried at 60° C. in vacuo. There are obtained 10.6 parts (97% of theory) of a red powder of the formula

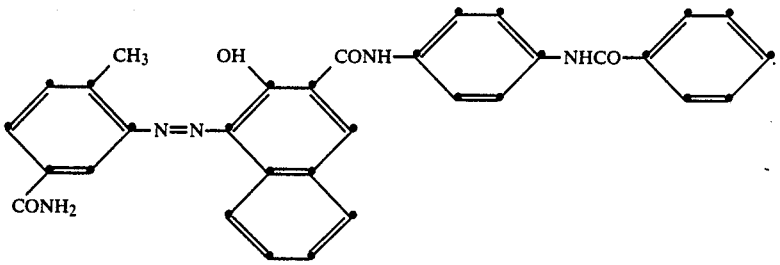

The pigment, aftertreated for 1 hour at 147° C. in dimethylformamide, produces, in soft polyvinyl chloride, deeply coloured, brilliant scarlet dyeings which are fast to migration, light and weather.

In the following Table are described further azo compounds according to the invention, which are obtained by diazotisation of the amine of column I, and subsequent coupling of the resulting diazo compound with the 4-benzoylamino-1-(2'-hydroxy-3'-naphthoylamino)-benzene. In column II is given the shade of colour of a soft PVC sheet dyed with 0.2% of the pigment obtained.

TABLE

| Example No. | I | II Shade in soft PVC (0.2% of pigment) |
|---|---|---|
| 2 | 3-amino-benzamide | red |
| 3 | 2-amino-terephthalic acid diamide | reddish-orange |
| 4 | 5-amino-isophthalic acid diamide | reddish-orange |
| 5 | 3-amino-4-ethoxycarbonyl benzamide | orange |
| 6 | 3-amino-4-methoxycarbonyl benzamide | orange |
| 7 | 3-amino-5-trifluoromethyl benzamide | orange |
| 8 | 3-amino-6-acetylamino-benzamide | red |
| 9 | 3-amino-6-benzoylamino-benzamide | carmine |
| 10 | 3-amino-6-nitro-benzamide | reddish-orange |

What is claimed is:

1. An azo compound of the formula

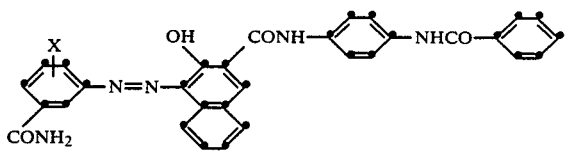

wherein
X is —H, —CH₃, —CF₃, —NO₂, —NHCOR₂ or —CONH₂, and
R₂ is C₁–C₄-alkyl, or phenyl which is unsubstituted or substituted by 1 to 3 halogen atoms, by one or two methyl or methoxy groups, or mixtures thereof.

2. An azo compound of the formula

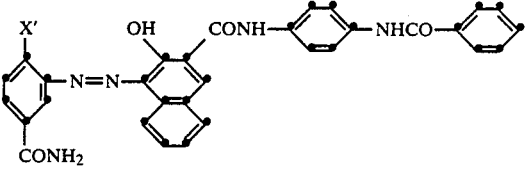

wherein X' is —H, —CH₃ or —CONH₂.

3. An azo compound according to claim 2, wherein X' is —H or —CH₃.

4. High-molecular organic material containing an azo compound according to claim 1.

* * * * *